United States Patent [19]

Zucker et al.

[11] Patent Number: 4,504,528
[45] Date of Patent: Mar. 12, 1985

[54] PROCESS FOR COATING AQUEOUS FLUOROPOLYMER COATING ON POROUS SUBSTRATE

[75] Inventors: Jerry Zucker, Charleston; Michael P. Singletary; James L. Fabian, both of Goose Creek, all of S.C.

[73] Assignee: RM Industrial Products Company, Inc., North Charleston, S.C.

[21] Appl. No.: 512,718

[22] Filed: Jul. 11, 1983

[51] Int. Cl.$^3$ .............................................. B05D 3/02
[52] U.S. Cl. .............................. 427/389.8; 427/385.5; 427/388.2; 427/388.4; 427/389.7; 427/393.5
[58] Field of Search ............... 427/389.8, 389.7, 393.6, 427/385.5, 388.4, 388.2, 393.5; 524/520; 525/209, 199; 65/3.44, 4.4

[56] References Cited

U.S. PATENT DOCUMENTS 3,075,939 1/1963 Bauer, Jr. et al. ............... 524/520 X

FOREIGN PATENT DOCUMENTS 997096 6/1965 United Kingdom ............... 524/520

Primary Examiner—Thurman K. Page
Attorney, Agent, or Firm—Gary, Juettner & Pyle

[57] ABSTRACT

A substrate such as a fabric is coated with a blend of a fluoroelastomer and particles of polytetrafluoroethylene or similar fluorocarbon resin, preferably in colloidal form. The elastomer and polymer may be applied as a mixture in the form of a liquid or water suspension, followed by heating.

3 Claims, No Drawings

PROCESS FOR COATING AQUEOUS FLUOROPOLYMER COATING ON POROUS SUBSTRATE

BACKGROUND OF THE INVENTION

There is a continuing need to provide chemical resistant and flexible coatings to substrates, particularly porous substrates such as cloth or other fabrics. Many coatings containing elastomers tend to crack when applied in multiple layers and adversely affect the tensile strength of the substrate. Another problem is to obtain good adhesion of the coating to the substrate in order to prevent delamination.

While it is possible to use an aqueous colloid of a fluorocarbon resin to coat fabrics, the resulting coating, when fused, tends to be brittle and porous and adversely affects the performance characteristics.

SUMMARY OF THE INVENTION

The present invention provides a coating composition or mixture that may be conveniently applied in multiple layers in a continuous fashion. The coating contains an aqueous colloidal suspension or lattice of a fluoroelastomer and small particles of a tetrafluoro polymer such as polyfluorotetraethylene or a similar polymer. After application, the suspension is dried and then heated to at least partially fuse the tetrafluoro polymer. The combination of the elastomer and polymer forms a coherent continuous elastoplastic film that is firmly adhered to the substrate. The surface of the film exhibits excellent chemical or corrosion resistance, is free of voids and cracks, is highly temperature resistant, and has low porosity. In addition, the surface has a low coefficient of friction, and the flexural characteristics and tensile strength of the substrate is not adversely affected by the presence of the coating.

DESCRIPTION OF THE PREFERRED EMBODIMENTS

The present invention contemplates a continuous coating or layer of fluoroplastic material on a substrate. Preferably, the substrate is porous and contains fibers, such as a cloth or other fabric, including non-woven, braided, knitted fabrics and the like. The fibers used in the material may be organic or inorganic, such as for example, glass, asbestos, ceramic, carbon, cotton, polymeric, metal, or combinations and mixtures thereof. A particularly suitable substrate is a woven material containing glass fibers, which may be treated with a bonding agent or combined with other relatively chemically inert fibers.

The coating is initially provided in a liquid vehicle that contains the elastomer and tetrafluoro polymer solids components, as well as other optional additives described herein. To facilitate the coating and handling procedure, the solid components are preferably provided in an aqueous medium, rather than an organic or other liquid, such that the water may be evaporated into the atmosphere without the need for recovery or containment.

The fluoroelastomer is preferably provided in a commercially available uncured latex form, wherein the elastomer is in the form of minute particles or a colloid in an aqueous medium, together with suspension aids, such as a surfactant. The term "fluoroelastomer" as used herein, includes copolymers of vinylidene fluoride and hexafluoropropylene, terpolymers of vinylidene fluoride, hexofluoropropylene and tetrafluoroethylene, alternating copolymers of propylene and tetrafluoroethylene, and mixtures thereof. The latex form of such elastomers is provided in various percentages of solids, typically in the range of 30 to 60 percent. Of the total solids of the coating, by weight, from about 2 to about 25 percent and preferably from about 2 to about 7 percent comprise the fluoroelastomer. The presence of the elastomer substantially enhances the flexibility of the final coating while reducing porosity.

A suitable fluoroelastomer for the purpose herein described is duPont LD-242 fluoroelastomer latex or "Florel" L-6517 or L-6546. Although not necessary as explained herein, a curing agent such as a diimine may be incorporated, as well as metallic oxides and fillers.

The other primary component in the aqueous coating mixture is small particles of a fluorocarbon such as tetrafluoro polymer. A typical polymer of this nature is sold under the trademark "Teflon". Suitable polymers, for example, would include polytetrafluoroethylene, tetrafluoroethylene-hexafluoropropylene copolymer, ethylene-tetrafluoroethylene copolymer, copolymer of perfluoroalkyl ethers and tetrafluoroethylene, and mixtures thereof. The tetrafluoro polymer is preferably provided by a known process in the form of a colloid or suspensoid, such as described in U.S. Pat. No. 2,685,707. In the alternative, the polymer may be provided in the form of a fine powder that is entrained in the fluoroelastomer latex. The polymer preferably comprises at least about 50 percent of the coating solids and may be present in an amount up to in excess of 90 percent of the solids.

In addition, while not essential or necessary, the aqueous mixture may contain inorganic fillers or fibers, such as carbon, clay, chopped inorganic fibers, other inorganic oxides and the like, in an amount up to about 35 percent of the coating solids, with the remainder as fluoroelastomer and polymer.

The tetrafluoro polymer is relatively inert and unreactive to a room temperature and typlically exhibits a melting or sintering point at temperatures above 600 degrees F. The fluoroelastomer, on the other hand, is furnished in an uncured state, and, surprisingly, does not require addtion of a curative normally used with such elastomers. In the alternative, however, suitable amounts of a curative may be included. In addition, compatible thickening agents may be included.

Following preparation of the aqueous mixture containing the fluoroelastomer and the tetrafluoro polymer, the substrate may be passed through a bath containing the coating, or the coating may be applied to one or both sides of the substrate by other suitable means, such as spraying, blade coating, or the like. The viscosity of the coating liquid and the dwell time of the substrate therein may be easily adjusted to obtain the desired degree of solids in each pass. Several layers of the coating may be applied by drying the substrate between passes through the bath.

Upon application, the coating contains a substantially continuous film of uncured fluoroelastomer and fluorocarbon particles, together with miscellaneous additives, such as surfactant and any additives.

The coated substrate may be calendered and is first heated to an intermediate temperature, in the order of about 400 to about 500 degrees F. to remove all traces of water and miscellaneous organic matter. The material is then heated to a temperature and for a time sufficient to at least partially fuse or coalesce the tetrafluoro polymer particles. Depending upon the polymer, temperatures in the order of 680 to 750 degrees F. are employed.

Upon heating as aforesaid, the elastomer cures, and it is believed that the elastomer either self-cures or combines with the polymer particles, with the result that the coating becomes substantially homogeneous, presumably in the form of a continuous, impervious elastoplastic film that is firmly adhered to the substrate. The fluoroelastomer aids or coacts with the fluorocarbon resin to improve resiliency and flexibility and to reduce porosity.

The resulting coating is highly flexible, non-porous, and chemical and temperature resistant. As a result, the coated substrate may be used for a variety of purposes involving high temperatures, pressures and corrosive atmosphere, such as in joints, seals, packings, wrappings, liners and the like. Other potential applications include high temperature rub strips or clamp cusions, which would take advantage of the low coefficient of friction of the material.

We claim:

1. Method of applying an impervious coating to porous substrate comprising the steps of preparing an aqueous suspension of solids comprising from about 2 to about 25 percent fluoroelastomer particles, zero to about 35 percent fillers, and the remainder as fluorocarbon resin particles, said fluoroelastomer being selected from the group consisting of copolymers of vinylidene fluoride and hexafluoropropylene, terpolymers of vinylidene fluoride, hexafluoropropylene and tetrafluoroethylene, alternating copolymers of propylene and tetrafluoroethylene, and mixtures thereof, said fluorocarbon resin being selected from the group consisting of polytetrafluoroethylene, tetrafluoroethylene-hexafluoropropylene copolymer, ethylene-tetrafluoroethylene copolymer, copolymer of perfluoroalkyl ethers and tetrafluoroethylene, and mixtures thereof, applying the aqueous suspension to the substrate to provide a coating thereon, and then heating the coated substrate under conditions to cause at least partial fusing of the fluorocarbon resin particles.

2. The method of claim 1 wherein said aqueous suspension comprises from about 2 to about 7 percent fluoroelastomer, and said fluoroelastomer and fluorocarbon resin particles are in the form of colloids.

3. The method according to claim 1 wherein said porous substrate comprises woven fabric of glass fibers.

* * * * *